US012157309B2

(12) United States Patent
Arakane

(10) Patent No.: US 12,157,309 B2
(45) Date of Patent: Dec. 3, 2024

(54) LIQUID EJECTING APPARATUS, LIQUID EJECTING METHOD AND NON-TRANSITORY STORAGE MEDIUM STORING INSTRUCTIONS EXECUTABLE BY THE LIQUID EJECTING APPARATUS

(71) Applicant: Brother Kogyo Kabushiki Kaisha, Nagoya (JP)

(72) Inventor: Satoru Arakane, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 203 days.

(21) Appl. No.: 18/054,241

(22) Filed: Nov. 10, 2022

(65) Prior Publication Data

US 2023/0166500 A1 Jun. 1, 2023

(30) Foreign Application Priority Data

Nov. 29, 2021 (JP) ................................ 2021-193145

(51) Int. Cl.
*B41J 2/165* (2006.01)
*B41J 2/045* (2006.01)

(52) U.S. Cl.
CPC ....... *B41J 2/04573* (2013.01); *B41J 2/04581* (2013.01); *B41J 2/16526* (2013.01); *B41J 2002/16573* (2013.01)

(58) Field of Classification Search
CPC .............. B41J 2002/16582; B41J 2/165; B41J 2/16526; B41J 2/04573
See application file for complete search history.

(56) References Cited

U.S. PATENT DOCUMENTS

| | | | |
|---|---|---|---|
| 2001/0020962 | A1 | 9/2001 | Kanaya et al. |
| 2007/0139487 | A1 | 6/2007 | Sekiguchi |

FOREIGN PATENT DOCUMENTS

| | | | |
|---|---|---|---|
| JP | H11-020198 | A | 1/1999 |
| JP | 2001-180007 | A | 7/2001 |
| JP | 2005-104107 | A | 4/2005 |
| JP | 2007-160819 | A | 6/2007 |

*Primary Examiner* — Julian D Huffman
(74) *Attorney, Agent, or Firm* — Scully, Scott, Murphy & Presser, P.C.

(57) ABSTRACT

A liquid ejecting apparatus includes an ejection head including a plurality of nozzles communicating with a pressure chamber and an actuator configured to apply pressure on liquid stored in the pressure chamber, a carriage, a storage storing information relating to a first timing when a non-ejecting flashing operation is started, and a controller. The actuator applies pressure on the liquid in the pressure chamber in the non-ejecting flashing operation so as to vibrate, without ejecting, the liquid in the plurality of nozzles of the ejection head, while the carriage is decreased in speed so as to be stopped. The controller is configured to select, based on status information, one of the first timing and a second timing, and start the non-ejecting-flashing operation at the selected timing while the carriage is decreased in speed so as to be stopped.

12 Claims, 8 Drawing Sheets

LIQUID EJECTING APPARATUS, LIQUID EJECTING METHOD AND NON-TRANSITORY STORAGE MEDIUM STORING INSTRUCTIONS EXECUTABLE BY THE LIQUID EJECTING APPARATUS

REFERENCE TO RELATED APPLICATIONS

The present application claims priority from Japanese Patent Application No. 2021-193145, which was filed on Nov. 29, 2021, the disclosure of which is herein incorporated by reference in its entirety.

BACKGROUND ART

The following disclosure relates to a liquid ejecting apparatus used for an image recording apparatus such as an ink-jet printer, a liquid ejecting method and a non-transitory storage medium storing instructions executable by the liquid ejecting apparatus.

There has been known a conventional ink-jet printer including an ejection head configured to eject a plurality of ink droplets from a plurality of nozzles on a printed medium. In the ejection head, a solvent in the ink in the plurality of nozzles which are not being ejected or which are infrequently used to be ejected goes dry. Accordingly, the viscosity of the ink increases, and there is a possibility that the ink is not easily ejected. To prevent this situation, there has been known a non-ejecting flashing operation in which the ink in the plurality of nozzles, in a pressure chamber and so on is agitated by using driving signals different from driving signals used when the ink is ejected. In the conventional liquid ejecting apparatus, the non-ejecting flashing operation is started at a timing when a carriage is started to be decreased in speed while the carriage moves toward a target stopping position.

DESCRIPTION

In the meantime, there is a possibility that the carriage stops at a position on a near side of the target stopping position due to various kinds of causes such as the wear of parts. That is, there is a possibility that the carriage stops before the time at which the carriage is supposed to be stopped. Accordingly, in a case where the non-ejecting flashing operation is always started at the timing when the carriage is started to be decreased in speed while the carriage moves toward the target stopping position, there is a possibility that the non-ejecting flashing operation is not completed yet at the timing when the carriage stops. As a result of this, since the next printing operation cannot be started until the non-ejecting flashing operation is completed, this causes the reduction of a throughput of printing.

An aspect of the disclosure relates to a liquid ejecting apparatus, a liquid ejecting method and a non-transitory storage medium storing instructions capable of suppressing the reduction of a throughput of printing.

In one aspect of the disclosure, a liquid ejecting apparatus includes an ejection head including a plurality of nozzles communicating with a pressure chamber and an actuator configured to apply pressure on liquid stored in the pressure chamber such that the liquid is ejected from the plurality of nozzles, a carriage configured to reciprocate in a moving direction the ejection head being mounted on the carriage, a storage storing information relating to a first timing when a non-ejecting flashing operation is started. the actuator applying pressure on the liquid in the pressure chamber in the non-ejecting flashing operation so as to vibrate, without ejecting, the liquid in the plurality of nozzles of the ejection head, while the carriage is decreased in speed so as to be stopped, and a controller configured to select, based on status information, one of the first timing and a second timing different from the first timing each stored in the storage, and start the non-ejecting-flashing operation at the selected timing while the carriage is decreased in speed so as to be stopped.

In another aspect of the disclosure, a liquid ejecting method is a method for a liquid ejecting apparatus. The liquid ejecting apparatus includes an ejection head including a plurality of nozzles communicating with a pressure chamber and an actuator configured to apply pressure on liquid stored in the pressure chamber such that the liquid is ejected from the plurality of nozzles, and a carriage configured to reciprocate in a moving direction, the ejection head being mounted on the carriage. The liquid ejecting method includes selecting, based on status information, one of a first timing and a second timing different from the first timing each stored in the storage, each of the first timing and the second timing being a timing when a non-ejecting flashing operation is started, the actuator applying pressure on the liquid in the pressure chamber in the non-ejecting flashing operation so as to vibrate, without ejecting the liquid in the plurality of nozzles of the ejection head, while the carriage is decreased in speed so as to be stopped, and starting the non-ejecting-flashing operation at the selected timing while the carriage is decreased in speed so as to be stopped.

In another aspect of the disclosure, a non-transitory storage medium stores a plurality of instructions executable by a computer of a liquid ejecting apparatus. The liquid ejecting apparatus includes an ejection head including a plurality of nozzles communicating with a pressure chamber and an actuator configured to apply pressure on liquid stored in the pressure chamber such that the liquid is ejected from the plurality of nozzles, and a carriage configured to reciprocate in a moving direction, the ejection head being mounted on the carriage. When executed by the computer, the plurality of instruction cause the liquid ejecting apparatus to select, based on status information, one of a first timing and a second timing different from the first timing each stored in the storage, each of the first timing and the second timing being a timing when a non-ejecting flashing operation is started, the actuator applying pressure on the liquid in the pressure chamber in the non-ejecting flashing operation so as to vibrate, without ejecting the liquid in the plurality of nozzles of the ejection head, while the carriage is decreased in speed so as to be stopped, and start the non-ejecting-flashing operation at the selected timing while the carriage is decreased in speed so as to be stopped.

The objects, features, advantages, and technical and industrial significance of the present disclosure will be better understood by reading the following detailed description of the embodiments, when considered in connection with the accompanying drawings, in which.

There will be described a liquid ejecting apparatus, a liquid ejecting method and a non-transitory storage medium storing instructions executable by the liquid ejecting apparatus of embodiments of the present disclosure with reference to drawings. In the following description, each of the liquid ejecting apparatus, the liquid ejecting method and the non-transitory storage medium storing instructions executable by the liquid ejecting apparatus is an example of the present disclosure. Accordingly, the disclosure is not limited to the details of the illustrated embodiment and modifications, but may be embodied with various changes and modifications, which may occur to those skilled in the art, without departing from the spirit and scope of the disclosure.

FIRST EMBODIMENT

Figure 1:
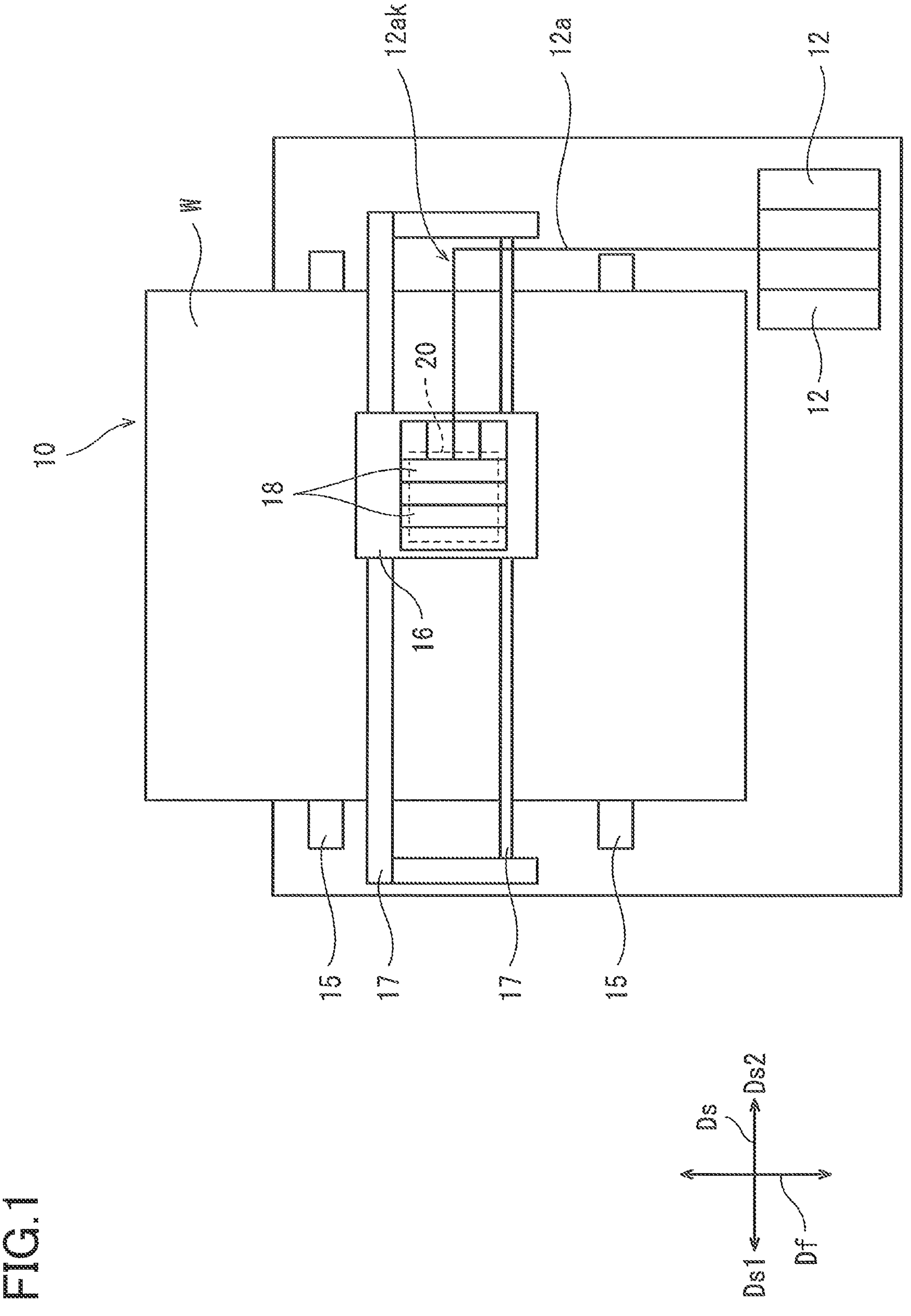
FIG. 1 is a schematic plan view illustrating a configuration of a liquid ejecting apparatus.

As illustrated in FIG. 1, a liquid ejecting apparatus 10 of the present embodiment uses ink as an example of liquid and ejects a plurality of ink droplets as an example of a plurality of liquid droplets. The liquid ejecting apparatus 10 includes reservoir tanks 12, a carriage 16, an ejection head 20, a pair of conveying rollers 15, a pair of guide rails 17 and sub-tanks 18. It is noted that a printed medium W is placed on a platen, which is not illustrated, in the liquid ejecting apparatus 10.

The ejection head 20 is mounted on the carriage 16. The carriage 16 is supported by the pair of guide rails 17 extending in a moving direction Ds which is orthogonal to a conveying direction Df of the printed medium W, an example of which is a printing sheet. The carriage 16 reciprocates along each of the guide rails 17 in the moving direction Ds. Accordingly, the ejection head 20 reciprocates in the moving direction Ds. The reservoir tanks 12 and the ejection head 20 are connected by a tube 12*a*. More specifically, for example, the four sub-tanks 18 are mounted on the carriage 16. Each of the sub-tanks 18 is connected to a corresponding one of the reservoir tanks 12 via the tube 12*a*. Each of the sub-tanks 18 supplies ink to a pressure chamber 28, which will be described below, of the ejection head 20. In this configuration, in the present embodiment, the reservoir tanks 12 are provided at positions spaced apart from the carriage 16. It is noted that each of the reservoir tanks 12 is an example of a second cartridge.

The ejection head 20 is, for example, an ink-jet head configured to eject the plurality of ink droplets. The ejection head 20 ejects the plurality of ink droplets in four colors, namely, yellow, magenta, cyan and black, generically called as color ink for example. A plurality of nozzle rows from which the plurality of ink droplets are ejected are provided for the ejection head 20. Each of the plurality of nozzle rows extends along the conveying direction Df. It is noted that the ejection head 20 may be an ink-jet head capable of ejecting a plurality of ink droplets in white color (W), and may be an ink-jet head capable of ejecting a plurality of ink droplets in clear (Cr).

The four reservoir tanks 12 are provided, and the four reservoir tanks 12 is disposed on a first side of a center of the guide rail 17 in the moving direction Ds, and the first side of the center of the guide rail 17 is a side nearer to a right end than a left end of the liquid ejecting apparatus 10 in FIG. 1. The moving direction Ds includes a first moving direction Ds1 and a second moving direction Ds2 which is an opposite direction to the first moving direction Ds1. The first moving direction Ds1 is a direction in which the carriage 16 moves away from the reservoir tanks 12, and the second moving direction Ds2 is a direction in which the carriage 16 moves toward the reservoir tanks 12. The tube 12*a* connects each of the reservoir tanks 12 and an end portion of each of the sub-tanks 18 in the second moving direction Ds2. It is noted that only the tube 12*a* is illustrated in FIG. 1 so as to simplify the configuration of the liquid ejecting apparatus 10, however, the tube 12*a* is provided for each of combinations between the reservoir tanks 12 and the sub-tanks 18. Accordingly, in the present embodiment, the four tubes 12*a* are provided. In this configuration, each of the tubes 12*a* has a bending portion 12*ak* which bends in each of a case where the carriage 16 moves in the first moving direction Ds1 and a case where the carriage 16 moves in the second moving direction Ds2. A degree of bending in the bending portion 12*ak* in the case where the carriage 16 moves in the second moving direction Ds2 is greater than a degree of bending in the bending portion 12*ak* in the case where the carriage 16 moves in the first moving direction Ds1. In other words, the bending portion 12*ak* has a first curvature in the case where the carriage 16 moves in the first direction Ds1 and a second curvature in the case where the carriage 16 moves in the second direction DS2, and the second curvature is larger than the first curvature.

The pair of conveying rollers 15 are arranged along the moving direction Ds in parallel to each other. The pair of conveying rollers 15 rotates when a conveying motor 31 (see FIG. 3), which will be described below, is driven. Accordingly, the printed medium W placed on the platen is conveyed in the conveying direction Df.

Ink is stored in each of the reservoir tanks 12. Each of the reservoir tanks 12 is connected to the ejection head 20 via a plurality of ink flow passages so as to supply the ink to the ejection head 20. Moreover, each of the reservoir tanks 12 is provided for a corresponding one of kinds of the ink. The four reservoir tanks 12 respectively storing black ink, yellow ink, cyan ink and magenta ink are provided.

Figure 2:
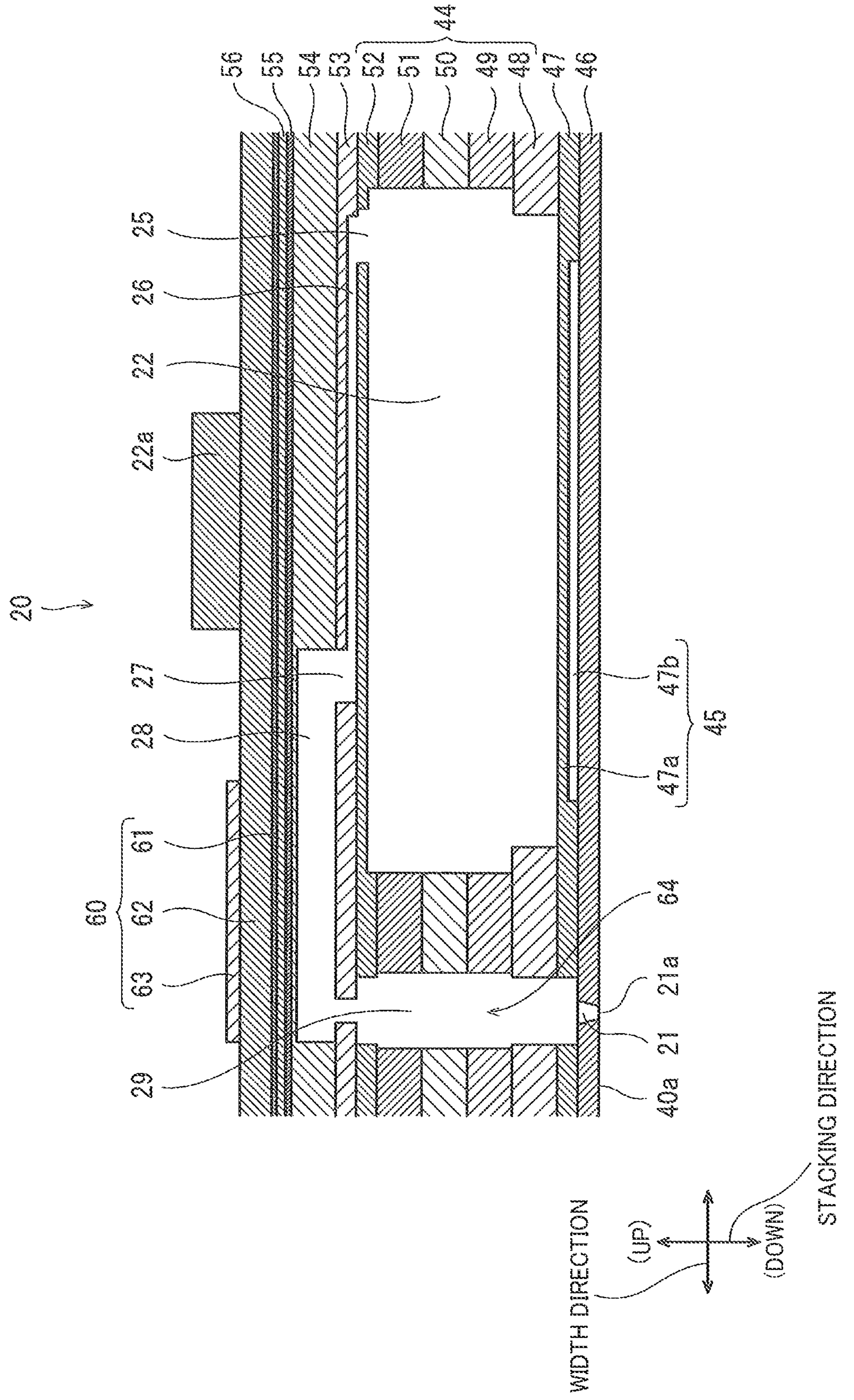
FIG. 2 is a cross-sectional view illustrating an ejection head of the liquid ejecting apparatus illustrated in FIG. 1.

As illustrated in FIG. 2, the ejection head 20 includes a plurality of nozzles 21 from which the plurality of ink droplets are ejected. The ejection head 20 includes a stacked body including a flow passage forming body and a volume changing unit. A plurality of liquid flow passages are formed in the flow passage forming body, and a plurality of nozzle openings 21*a* are formed on a nozzle surface 40*a* which is a lower surface of the flow passage forming body. Moreover, the volume changing unit is configured to change a volume of the plurality of liquid flow passages when being driven. At this time, the ink is ejected while a meniscus is vibrated in each of the plurality of nozzle openings 21*a*.

The flow passage forming body of the ejection head 20 is a stacked body constituted by a plurality of plates, and the volume changing unit includes a vibrating plate 55 and an actuator 60, which is a plurality of piezo-electric elements. The actuator 60 applies pressure on the ink stored in the pressure chamber 28, which will be described below, and the plurality of ink droplets are ejected, by the pressure, from the plurality of nozzles 21 communicating with the pressure chamber 28. An insulating layer 56 is placed on the vibrating plate 55, and a common electrode 61, which will be described below, is placed on the insulating layer 56.

The plurality of plates include a nozzle plate 46, a spacer plate 47, a first flow passage plate 48, a second flow passage plate 49, a third flow passage plate 50, a fourth flow passage plate 51, a fifth flow passage plate 52, a sixth flow passage plate 53 and a seventh flow passage plate 54, which are stacked in order from below. It is noted that a manifold plate 44 is constituted by the first flow passage plate 48, the second flow passage plate 49, the third flow passage plate 50, the fourth flow passage plate 51 and the fifth flow passage plate 52.

Various kinds of holes and grooves of all sizes are formed in each of the plurality of plates. The plurality of nozzles 21, a plurality of individual flow passages 64 and a manifold 22 are formed, as the plurality of flow passages, by combining the holes and the grooves, in the flow passage forming body constituted by the stacked plurality of plates.

The plurality of nozzles 21 are formed so as to pierce through the nozzle plate 46 in a stacking direction. The plurality of nozzle openings 21*a*, which correspond to tip ends of the plurality of nozzles 21, are formed on the nozzle surface 40*a* of the the nozzle plate 46 so as to be arranged in an arranging direction which is the same direction as the conveying direction Df.

The manifold 22 supplies the ink to the pressure chamber 28 to which ejecting pressure of the plurality of ink droplets is applied. The manifold 22 extends in the arranging direction of the plurality of nozzle openings 21*a*, and the manifold 22 is connected to an end of each of the plurality of individual flow passages 64. That is, the manifold 22 functions as a common flow passage of the ink. The manifold 22 is formed by stacking, in the stacking direction, (i) a piercing hole which pierces from the first flow passage plate 48 to the fourth flow passage plate 51 in the stacking direction and (ii) a recess recessed from a lower surface of the fifth flow passage plate 52.

The nozzle plate 46 is disposed below the spacer plate 47. The spacer plate 47 is made of stainless steel, for example. The spacer plate 47 has a recessed portion 45 in which a thin portion constituting a damper portion 47*a* and a damper space 47*b* are formed by recessing the spacer plate 47 in a thickness direction of the spacer plate 47 from one surface of the spacer plate 47 nearer to the nozzle plate 46 than the other surface of the spacer plate 47 by a half etching method, for example. According to this configuration, the damper space 47*b* as a buffer space is formed between the manifold 22 and the nozzle plate 46.

A supplying port 22*a* communicates with the manifold 22. The supplying port 22*a* has a tubular shape, for example, and the supplying port 22*a* is located at a first end of the ejection head 20 in the arranging direction.

The plurality of individual flow passages 64 are connected to the manifold 22. Upstream ends of the plurality of individual flow passages 64 are connected to the manifold 22, and downstream ends of the plurality of individual flow passages 64 are connected to base ends of the plurality of nozzles 21. The plurality of individual flow passages 64 are constituted by a first communicating opening 25, a supply narrowing passage 26 which is an individual narrowing passage, a second communicating opening 27, the pressure chamber 28 and a descender 29, and these configuration elements are arranged in this order. The pressure chamber 28 communicates with the plurality of nozzles 21.

A lower end of the first communicating opening 25 is connected to an upper end of the manifold 22. The first communicating opening 25 extends upward in the stacking direction from the manifold 22, and pierces through an upper portion in the fifth flow passage plate 52 in the stacking direction.

An upstream end of the supply narrowing passage 26 is connected to an upper end of the first communicating opening 25. The supply narrowing passage 26 is formed by a half etching method, for example, and the supply narrowing passage 26 is constituted by a groove recessed from a lower surface of the sixth flow passage plate 53. Moreover, an upstream end of the second communicating opening 27 is connected to a downstream end of the supply narrowing passage 26. The second communicating opening 27 extends upward in the stacking direction from the supply narrowing passage 26, and is formed so as to pierce through the sixth flow passage plate 53 in the stacking direction.

An upstream end of the pressure chamber 28 is connected to a downstream end of the second communicating opening 27. The pressure chamber 28 is formed so as to pierce through the seventh flow passage plate 54 in the stacking direction.

The descender 29 is formed so as to pierce through the spacer plate 47, the first flow passage plate 48, the second flow passage plate 49, the third flow passage plate 50, the fourth flow passage plate 51, the fifth flow passage plate 52 and the sixth flow passage plate 53 in the stacking direction, and the descender 29 is disposed on a left side of the manifold 22 in a width direction. An upstream end of the descender 29 is connected to a downstream end of the pressure chamber 28, and a downstream end of the descender 29 is connected to the base ends of the plurality of nozzles 21. The plurality of nozzles 21 overlay on the descender 29 when viewed from the stacking direction, for example, and the plurality of nozzles 21 are disposed at a center of the descender 29 in the width direction orthogonal to the stacking direction.

The vibrating plate 55 is stacked on the seventh flow passage plate 54 and covers an upper end opening of the pressure chamber 28.

The actuator 60 includes the common electrode 61, a piezoelectric layer 62 and a plurality of individual electrodes 63, which are stacked in this order from below. The common electrode 61 covers the entire surface of the vibrating plate 55 via the insulating layer 56. The piezoelectric layer 62 covers the entire surface of the common electrode 61. Each of the individual electrodes 63 is provided for a corresponding one of pressure chambers 28, and disposed on the piezoelectric layer 62. The single actuator 60 is constituted by the single individual electrode 63, the common electrode 61 and a portion of the piezoelectric layer 62 interposed between the single individual electrode 63 and the common electrode 61.

Each of the individual electrodes 63 is electrically connected to the driver IC. The driver IC generates driving signals by receiving control signals from a controller 71, which will be described below, and the driver IC applies the driving signals to each of the individual electrodes 63. On the other hand, the common electrode 61 is kept at ground potential at all times. In this configuration, an active part of the piezoelectric layer 62 expands and contracts together with the common electrode 61 and the individual electrode 63 in a plane direction in accordance with the driving signals. The vibrating plate 55 deforms in accordance with the expansions and the contractions of the piezoelectric layer 62 so as to change a volume of the pressure chamber 28. As a result of this, ejection pressure by which each of the plurality of ink droplets is ejected from a corresponding one of the plurality of nozzles 21 is applied to the pressure chamber 28.

In the ejection head 20, the supplying port 22*a* is connected to the sub-tank 18 via a tube. When a pressurizing pump provided for the tube is driven, ink flows into the manifold 22 from the sub-tank 18 through the tube and the supplying port 22*a*. Then, the ink flows into the supply narrowing passage 26 from the manifold 22 through the first communicating opening 25, and the ink flows into the pressure chamber 28 from the supply narrowing passage 26 through the second communicating opening 27. Then, the ink flows to the descender 29, and the ink flows into the plurality of nozzles 21 from the descender 29. At this time, when the ejection pressure is applied to the pressure chamber 28 by the actuator 60, the ink droplet is ejected from the corresponding one of the plurality of nozzle openings 21*a*.

Next, there will be described the above described configuration elements and other configuration elements of the liquid ejecting apparatus 10 in the present embodiment with reference to a block diagram.

Figure 3:
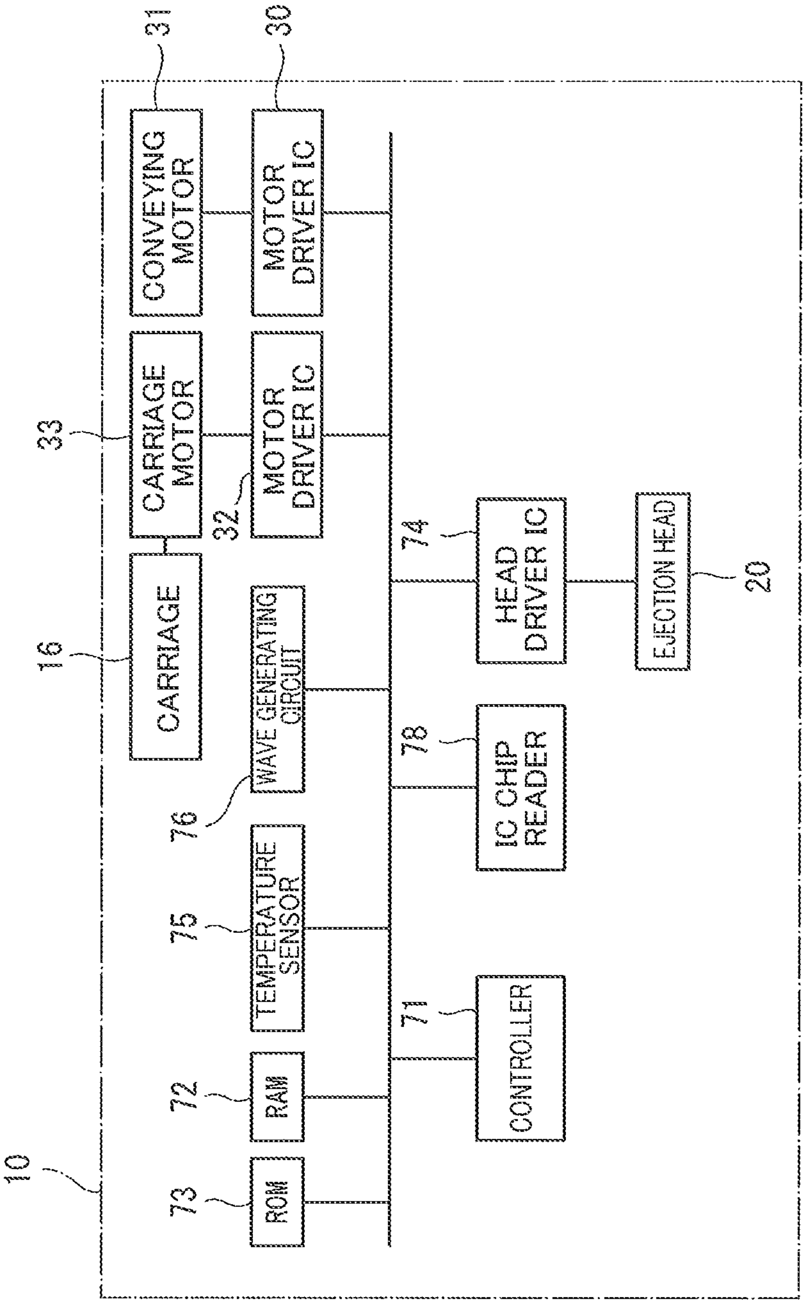
FIG. 3 is a block diagram of a configuration of the liquid ejecting apparatus illustrated in FIG. 1.

As illustrated in FIG. 3, the liquid ejecting apparatus 10 includes the controller 71 which corresponds to a computer constituted by a CPU, a RAM 72, a ROM 73, a head driver IC 74, a temperature sensor 75, a wave generating circuit 76, an IC chip reader 78, motor driver ICs 30, 32, the conveying motor 31, and a carriage motor 33 in addition to the above described configuration elements.

The temperature sensor 75 detects a temperature in a place where the liquid ejecting apparatus 10 is placed as environment temperature. The temperature sensor 75 is provided at, for example, the carriage 16. The controller 71 receives the temperature which is a result detected by the temperature sensor 75.

The wave generating circuit 76 generates driving waves including driving signals for driving the actuator 60. The driving signals includes (i) ejection-driving signals by which pressure is applied on the ink in the pressure chamber 28 such that the plurality of ink droplets are ejected from the plurality of nozzles 21, (ii) non-ejection-driving signals by which pressure is applied on the ink in the pressure chamber 28 such that meniscuses in the plurality of nozzles 21 and the ink in the pressure chamber 28 and so on are vibrated or agitated without ejecting the plurality of ink droplets from the plurality of nozzles 21, and (iii) non-vibrating signals by which meniscuses in the plurality of nozzles 21 are not vibrated. The controller 71 applies the non-ejection-driving signals generated by the wave generating circuit 76 to the actuator 60 while the carriage 16 is decreased in speed so as to be stopped. As a result of this, a non-ejecting flashing operation is performed in the ejection head 20.

The ROM 73 stores information relating to a first timing which is a timing when the non-ejecting flashing operation is started while the carriage 16 is decreased in speed so as to be stopped and information relating to a correction distance. It is noted that the first timing and the correction distance will be described below. Moreover, the RAM 72 stores a threshold relating to status information, which will be described below, a print job and ejection data received from external personal computers and so on. The RAM 72 and the ROM 73 correspond to a storage. Moreover, the ROM 73 stores a liquid ejecting program used by the liquid ejecting apparatus 10 in the present embodiment and a control program for executing various data processes, and so on.

The controller 71 selects one of the first timing and a second timing different from the first timing each stored in the RAM 72, based on the status information which is numerical information indicating a status of the liquid ejecting apparatus 10. Then, the controller 71 starts the non-ejecting flashing operation at the selected timing while the carriage 16 is decreased in speed so as to be stopped. It is noted that details of the non-ejecting flashing operation by the controller 71 and the status information will be described below. It is noted that the controller 71 corresponds to a selecting process and a non-ejecting-flashing operation instructing process.

In a case where an ink cartridge integrated with the ejection head 20 as one body is used in the same manner as a second embodiment, which will be described below, the IC chip reader 78 reads information of an IC chip provided for the integrated ink cartridge and determines whether the ink cartridge is a large-volume cartridge or a small-volume cartridge based on the information of the IC chip. In other words, the IC chip reader 78 determines whether the ink cartridge is a first-volume cartridge or a second-volume cartridge, a volume of which is smaller than that of the first-volume cartridge based on the information of the IC chip. The controller 71 receives a determination by the IC chip reader 78 as a result detected by the IC chip reader 78. The IC chip reader 78 is provided at, for example, the carriage 16. It is noted that the IC chip reader 78 corresponds to a detector.

The head driver IC 74 causes the ejection head 20 to eject the plurality of ink droplets in accordance with instructions from the controller 71. The motor driver IC 30 controls and drives the conveying motor 31 in accordance with instructions from the controller 71. The conveying motor 31 controls the pair of conveying rollers 15 to convey the printed medium W in the conveying direction Df. Moreover, a motor driver IC 32 controls and drives the carriage motor 33 in accordance with instructions from the controller 71. The carriage motor 33 controls the carriage 16 such that the ejection head 20 moves in the moving direction Ds.

Figure 4:
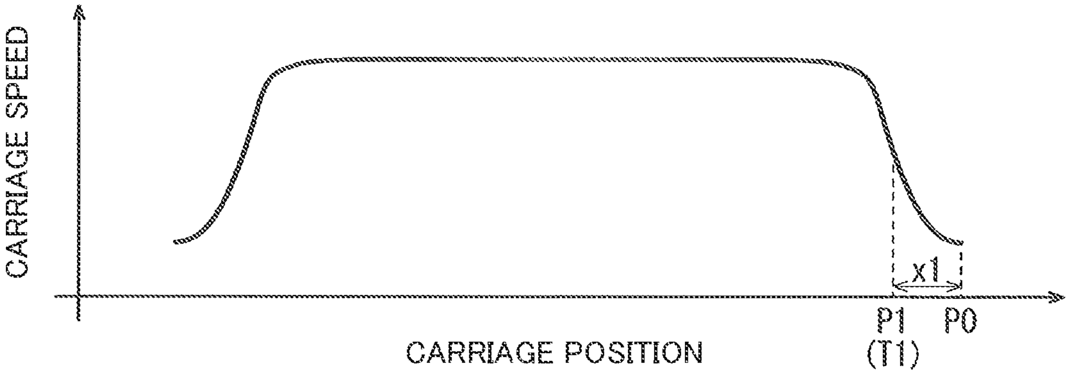
FIG. 4 is a view for explaining a non-ejecting flashing operation which is started at a first timing.
Figure 5:
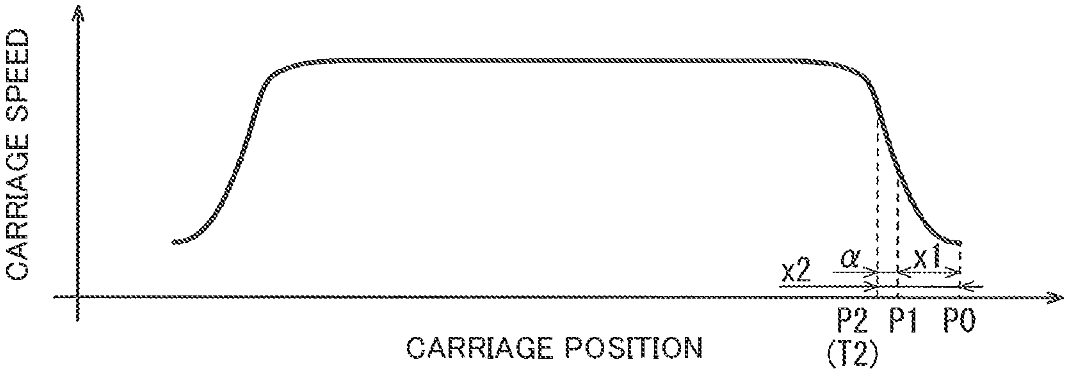
FIG. 5 is a view for explaining the non-ejecting flashing operation which is started at a second timing different from the first timing.

Next, there will be described the non-ejecting flashing operation performed by the controller 71 with reference to drawings. FIG. 4 is a view for explaining the non-ejecting flashing operation which is started at the first timing T1. FIG. 5 is a view for explaining the non-ejecting flashing operation which is started at a second timing T2 different from the first timing T1.

As illustrated in FIG. 4, the controller 71 causes the motor driver IC 32 to drive the carriage motor 33 when a path printing is started by the ejection head 20. As a result of this, the carriage 16 starts to move in the moving direction Ds (the first moving direction Ds1 or the second moving direction Ds2). In this case, a movement speed of the carriage 16 increases to a target speed, and then the movement speed of the carriage 16 is kept at a nearly constant speed.

Next, the controller 71 stops the driving of the carriage motor 33 by the motor driver IC 32 such that the carriage 16 stops at a target stopping position P0 when the controller 71 causes the ejection head 20 to stop the path printing. As a result of this, the carriage 16 starts to be decreased in speed while the carriage 16 moves toward the target stopping position P0.

And, the controller 71 selects one of the first timing T1 and the second timing T2 so as to start the non-ejecting flashing operation at the selected timing while the carriage 16 is decreased in speed. There will be described the operation in detail below.

As illustrated in FIG. 4, the first timing T1 is a timing when the carriage 16 reaches a first starting position P1 on a near side of the target stopping position P0 by a first distance x1 in the moving direction Ds. In a case where a numerical value indicated by the status information is less than the threshold, the controller 71 starts the non-ejecting flashing operation at the first timing T1 when the carriage 16 reaches the first starting position P1 after the carriage 16 starts to move. As a result of this, it is possible to complete the non-ejecting flashing operation by a timing when the carriage 16 stops.

On the other hand, as illustrated in FIG. 5, the second timing T2 is a timing when the carriage 16 reaches a second starting position P2 on the near side of the target stopping position P0 in the moving direction Ds by a second distance x2 which is the sum of the first distance x1 and a correction distance α. The controller 71 may correct the correction distance α based on the numerical value of the status information. In a case where the numerical value of the status information is equal to or greater than the threshold, the controller 71 starts the non-ejecting flashing operation at the second timing T2 when the carriage 16 reaches the second starting position P2 after the carriage 16 starts to move. As a result of this, it is possible to complete the non-ejecting flashing operation by the timing when the carriage 16 stops.

There will be described below the status information with a plurality of examples. The status information is, for example, a number of the printed medium W (a cumulative number of printed sheets) on which images are printed when the plurality of ink droplets are ejected from the plurality of nozzles 21. The number of the printed medium W is a number of printed sheets which has been counted since the liquid ejecting apparatus 10 started to be used as a brand-new article. The number of the printed medium W can be counted by, for example, a counter for the number of printed sheets. In a case where the number of the printed medium W is less than the threshold, there is a possibility that the carriage 16 stops at a position on a near side of the target stopping position P0 due to various kinds of causes such as aged deterioration of parts constituting the carriage 16 and so on. In this case, when the non-ejecting flashing operation is started at the first timing T1, it is possible to complete the non-ejecting flashing operation by the timing when the carriage 16 stops. Or, in a case where the number of the printed medium W is equal to or greater than the threshold, there is the possibility that the carriage 16 stops on the near side of the target stopping position P0 due to the various kinds of causes. Even in the case, when the non-ejecting flashing operation is started at the second timing T2 which is before the first timing T1, it is possible to complete the non-ejecting flashing operation by the timing when the carriage 16 stops.

Moreover, the status information may be a number of times the carriage 16 is driven. In this case, only a going movement of the carriage 16 may be counted as one time, only a returning movement of the carriage 16 may be counted as one time, or a going and returning movement of the carriage 16 may be counted as one time. The number of times the carriage 16 is driven can be obtained based on, for example, the ejection data. In a case where the number of times the carriage 16 is driven is less than the threshold, there is the possibility that the carriage 16 stops on the near side of the target stopping position P0 due to the various kinds of causes. In this case, when the non-ejecting flashing operation is started at the first timing T1, it is possible to complete the non-ejecting flashing operation by the timing when the carriage 16 stops. Or, in a case where the number of times the carriage 16 is driven is equal to or greater than the threshold, there is the possibility that the carriage 16 stops on the near side of the target stopping position P0 due to the various kinds of causes. Even in this case, when the non-ejecting flashing operation is started at the second timing T2 before the first timing T1, it is possible to complete the non-ejecting flashing operation by the timing when the carriage 16 stops.

Moreover, the status information may be environmental temperature detected by the temperature sensor 75. In a case where the environmental temperature detected by the temperature sensor 75 is equal to or greater than the threshold, there is the possibility that the carriage 16 stops on the near side of the target stopping position P0. In this case, when the non-ejecting flashing operation is started at the first timing T1, it is possible to complete the non-ejecting flashing operation by the timing when the carriage 16 stops. Or, in a case where the environmental temperature is less than the threshold, there is the possibility that the carriage 16 stops on the near side of the target stopping position P0. Even in this case, when the non-ejecting flashing operation is started at the second timing T2 before the first timing T1, it is possible to complete the non-ejecting flashing operation by the timing when the carriage 16 stops.

Moreover, the status information may be a moving direction of the moving direction Ds of the carriage 16. In a case where the carriage 16 moves in the first moving direction Ds1, a relatively small repelling force caused by the tube 12*a* is applied to the carriage 16. As a result of this, there is the possibility that the carriage 16 is stopped on the near side of the target stopping position P0. In this case, when the non-ejecting flashing operation is started at the first timing T1, it is possible to complete the non-ejecting flashing operation by the timing when the carriage 16 stops. On the other hand, in a case where the carriage 16 moves in the second moving direction Ds2, a relatively large repelling force caused by the tube 12*a* is applied to the carriage 16. As a result of this, there is the possibility that the carriage 16 stops on the near side of the target stopping position P0. Even in this case, when the non-ejecting flashing operation is started at the second timing T2 before the first timing T1, it is possible to complete the non-ejecting flashing operation by the timing when the carriage 16 stops.

Figure 6:
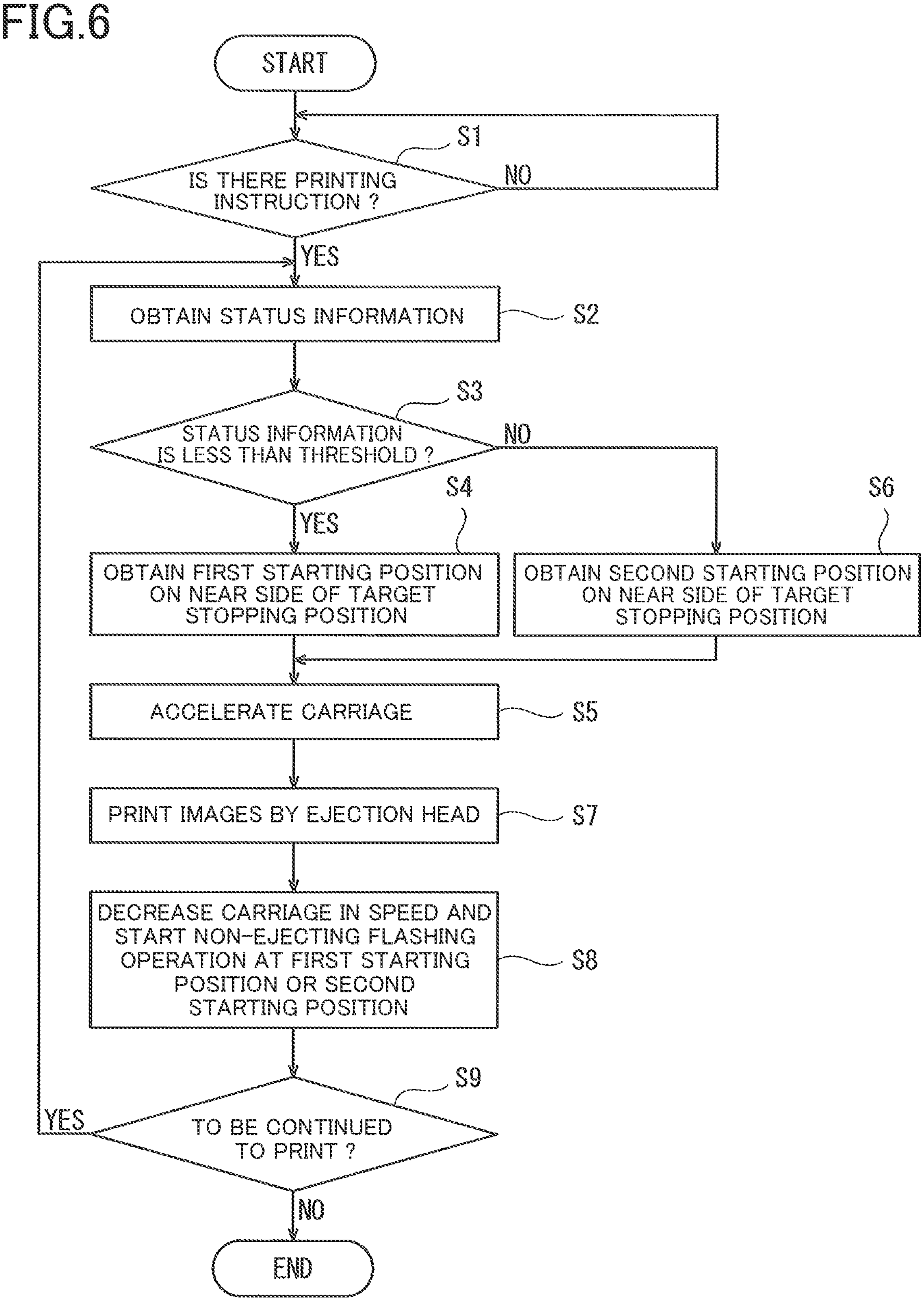
FIG. 6 is a flow chart illustrating an example of a control flow executed by a controller.

Next, there will be described a control flow by the controller 71 in the present embodiment with reference to a flow chart. FIG. 6 is the flow chart illustrating an example of the control flow executed by the controller 71.

As illustrated in FIG. 6, the controller 71 determines first whether there is a printing instruction or not (step S1). When it is determined that there is the printing instruction (step S1: YES), the controller 71 executes a process at step S2, which will be described below. On the other hand, when it is determined that there is no printing instructions (step S1:NO), the controller 71 waits until the printing instruction is received.

The controller 71 obtains the status information at step S2. Next, the controller 71 determines whether the numerical value of the obtained status information is less than the predetermined threshold or not (step S3). When it is determined that the numerical value of the status information is less than the threshold (step S3: YES), the controller 71 obtains the first starting position P1 which is a position on the near side of the target stopping position P0 (step S4). Then, the controller 71 accelerates the carriage 16 in speed (step S5).

On the other hand, when it is determined that the numerical value of the status information is equal to or greater than a threshold, (step S3:NO), the controller 71 obtains the second starting position P2 which is a position on the near side of the target stopping position P0 (step S6), and accelerates the carriage 16 in speed. (step S5). It is noted that the controller 71 can obtain the first starting position P1 and the second starting position P2 based on the number of revolutions of the carriage motor 33 which can be obtained by, for example, an encoder. Moreover, the controller 71 may suitably change the first starting position P1 based on the numerical value of the status information as numerical information. It is noted that in a case where the second starting position P2 is changed based on the numerical value of the status information, the controller 71 can suitably change the second starting position P2 by changing the correction distance α related to the first starting position P1, as described above.

After the process at step S5, the controller 71 control the ejection head 20 to print images (step S7). Next, the controller 71 starts the non-ejecting flashing operation at the first starting position P1 or the second starting position P2 while decreasing the carriage 16 in speed (step S8).

After the process at step S8, the controller 71 determines whether there is the remaining data to be printed continuously or not (step S9). It is determined that there is the remaining data to be printed continuously (step S9: YES), the controller 71 returns to the process at step S2, and repeats the processes after step S2. On the other hand, it is determined that there is no remaining data to be printed continuously (step S9:NO), the controller 71 end the processes.

It is noted that in a case where the moving direction of the second moving direction Ds2 of the carriage 16 is used as the status information, it is determined whether the moving direction of the carriage 16 is the second moving direction Ds2 or not at step S3. In a case where it is determined that the moving direction of the carriage 16 is not the second moving direction Ds2, that is, in a case where the moving direction of the carriage 16 is the first moving direction Ds1 (step S3: YES), the controller 71 obtains the first starting position P1 (step S4). In a case where it is determined that the moving direction of the carriage 16 is the second moving direction Ds2 (step S3:NO), the controller 71 obtains the second starting position P2. (step S6).

As described above, according to the present embodiment, the non-ejecting flashing operation is started at the timing which is one of the first timing T1 and the second timing T2 based on the status information, in contrast to the conventional liquid ejecting apparatus in which the non-ejecting flashing operation is always started at a timing when the carriage is started to be decreased in speed while the carriage moves toward the target stopping position. As a result of this, it is possible to complete the non-ejecting flashing operation by the timing when the carriage 16 stops. Accordingly, it is possible to prevent a situation in which the non-ejecting flashing operation is not completed yet when the carriage 16 stops. As a result, it is possible to proceed to a next printing operation just after the timing when the carriage 16 stops. Therefore, it is possible to suppress or prevent a reduction of a throughput of printing.

Moreover, in the present embodiment, at least one of the number of the printed medium W, the number of times the carriage 16 is driven, and the environmental temperature detected by the temperature sensor 75, which can be the causes causing the carriage 16 to be stopped on the near side of the target stopping position P0 in the moving direction, is used as the status information. As a result of this, even if the carriage 16 is stopped on the near side of the target stopping position P0 due to the causes, it is possible to complete the non-ejecting flashing operation by the timing when the carriage 16 stops.

Moreover, in the present embodiment, the moving direction Ds of the carriage 16, which can be the cause causing the carriage 16 to be stopped on the near side of the target stopping position P0, is used as the status information. As a result of this, even if the carriage 16 is stopped on the near side of the target stopping position P0 due to the cause, it is possible to complete the non-ejecting flashing operation by the timing when the carriage 16 stops.

Furthermore, in the present embodiment, the correction distance α is corrected based on the value of the status information. As a result of this, it is possible to suitably set the correction distance α in accordance with the variable value of the status information. Accordingly, it is possible to suitably set a starting position of the non-ejecting flashing operation.

SECOND EMBODIMENT

Figure 7:
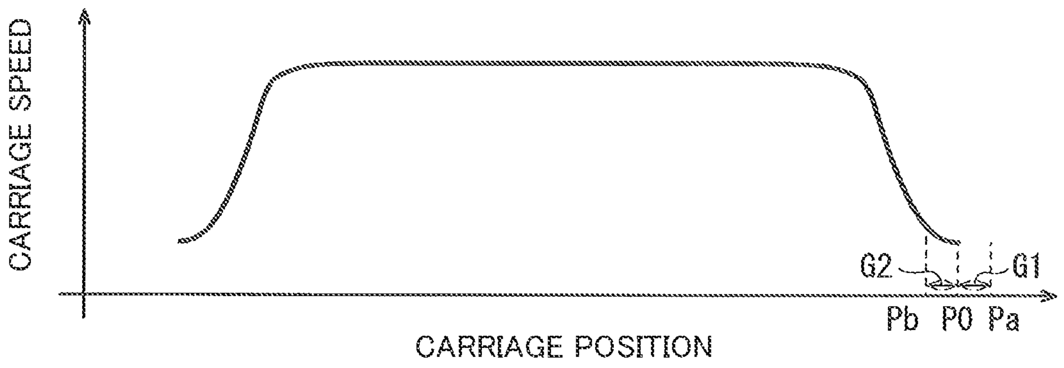
FIG. 7 is a view for explaining the non-ejecting flashing operation performed based on a difference between a target stopping position and an actual stopping position of a carriage.

There will be described a second embodiment below. FIG. 7 is a view for explaining the non-ejecting flashing operation performed based on a difference between a target stopping position P0 and an actual stopping position of the carriage 16.

The controller 71 obtains the difference between the target stopping position P0 of the carriage 16 and the actual stopping position at which the carriage 16 actually stops. The controller 71 can obtain information relating to the actual stopping position of the carriage 16 based on the number of revolutions of the carriage motor 33 which can be obtained by, for example, an encoder. As illustrated in FIG. 7, (i) a difference G1 between the target stopping position P0 and an actual stopping position Pa, which is on a far side of the target stopping position P0 in the moving direction, and (ii) a difference G2 between an actual stopping position Pb, which is on the near side of the target stopping position P0 and the target stopping position P0 in the moving direction are stored in the RAM 72 or the ROM 73 as histories. A singular number or a plural number of the difference G1 and a singular number or a plural number of the difference G2 may be stored as the plurality of histories. In this case, in a case where the plurality of histories are used, an average of the plurality of histories may be used. The controller 71 may use the difference G1 between the target stopping position P0 of the carriage 16 and the actual stopping position Pa in the histories as the status information, and the controller 71 may use the difference G2 between the target stopping position P0 of the carriage 16 and the actual stopping position Pb in the histories as the status information. The controller 71 obtains the starting position, which is a position at which the non-ejecting flashing operation is started, in accordance with the difference, and starts the non-ejecting flashing operation at the timing when the carriage 16 is positioned at the obtained starting position. Accordingly, it is possible to complete the non-ejecting flashing operation by the timing when the carriage 16 stops.

Figure 8:
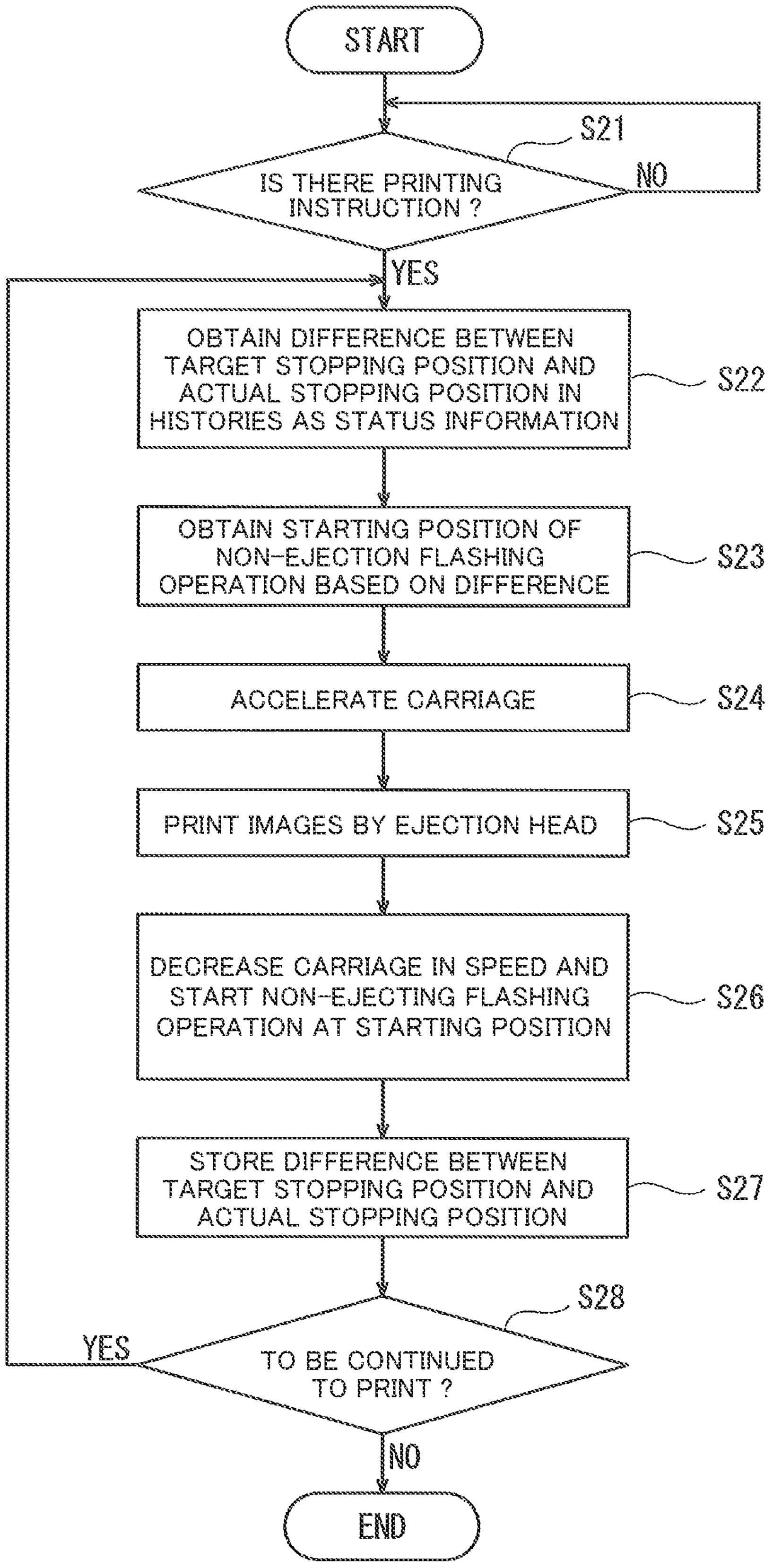
FIG. 8 is a flow chart illustrating an example of a control flow executed by the controller.

Next, there will be described a control flow executed by the controller 71 in the present embodiment with reference to a flow chart. FIG. 8 is a flow chart illustrating an example of the control flow executed by the controller 71.

As illustrated in FIG. 8, the controller 71 first determines whether there is the instruction for printing images or not (step S21). In a case where it is determined that there is the instruction for printing images (step S21: YES), the controller 71 executes a process executed at step S22. On the other hand, in a case where it is determined that there is no instructions for printing images (step S21:NO), the controller 71 waits until the instruction for printing images is received.

The controller 71 obtains the difference G1 (G2) between the target stopping position P0 of the carriage 16 and the actual stopping position Pa (Pb) as the status information at step S22. Next, the controller 71 obtains the starting position of the non-ejecting flashing operation in accordance with the obtained difference G1 (G2) (step S23). Then, the controller 71 accelerates the carriage 16 (step S24).

After the process at step S24, the controller 71 controls the ejection head 20 to execute the printing operation (step S25). Next, the controller 71 starts the non-ejecting flashing operation at the timing when the carriage 16 is positioned at the starting position while the carriage 16 is decreased in speed (step S26).

After the process at step S26, the controller 71 stores a difference between the target stopping position P0 and the current stopping position as a new history into the RAM 72 or the ROM 73 (step S27). Then, the controller 71 determines whether there is the remaining data to be printed continuously or not (step S28). In a case where it is determined that there is the remaining data to be printed continuously (step S28: YES), the controller 71 returns to the process at step S22, and repeats the processes after step S22. On the other hand, in a case where it is determined that there is no remaining data to be printed continuously (step S28:NO), the controller 71 end the processes.

According to the present embodiment, the difference G1 (G2) between the target stopping position P0 of the carriage 16 and the actual stopping position Pa (Pb) as the status information in the histories is used. Accordingly, it is possible to set the suitable starting position at which the non-ejecting flashing operation is started in accordance with the difference.

THIRD EMBODIMENT

Figure 9:
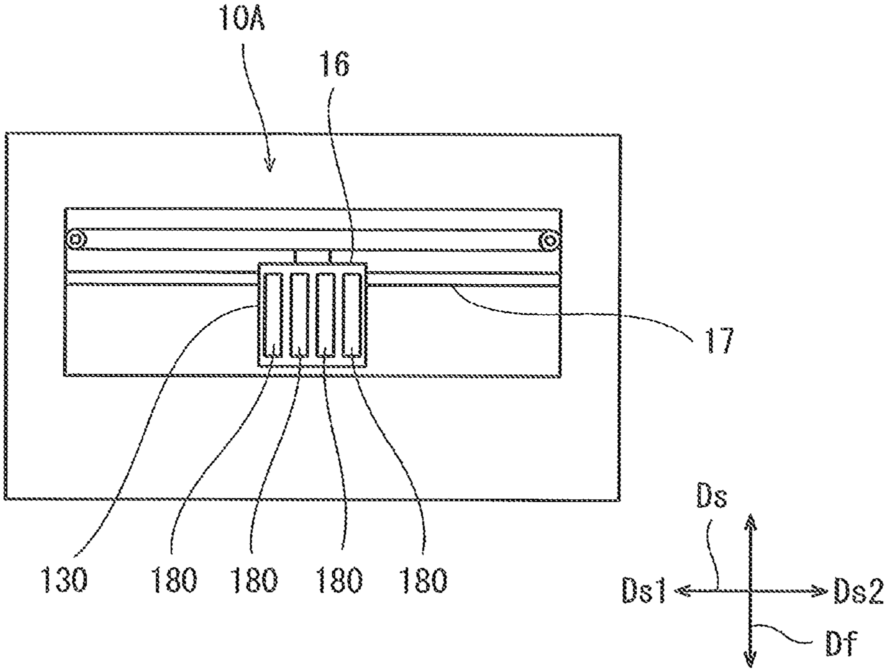
FIG. 9 is a view illustrating a cartridge integrated with the ejection head as one body.

There will be described a third embodiment below. As illustrated in FIG. 9, the liquid ejecting apparatus 10A in the present embodiment includes the carriage 16, the guide rail 17 supporting the carriage 16 so as to be movable, and an ink cartridge 180 including the ejection head. The ink cartridge 180 is configured to supply ink to the pressure chamber 28 of the ejection head and the ink cartridge 180 is provided at the carriage 16. It is noted that the ink cartridge 180 corresponds to a first cartridge.

A mount portion 130 is provided on an upper surface side of the carriage 16, and, for example, the four ink cartridge 180 are mounted on the upper side of the cartridge 16 so as to be mountable on and removable from the mount portion 130. The ejection head is provided on a lower surface side of the ink cartridge 180. Moreover, it is detected whether the ink cartridge 180 being mounted on the mount portion 130 is a large-volume ink cartridge or a small-volume ink cartridge by the IC chip reader 78 illustrated in FIG. 3. The large-volume ink cartridge corresponds to a first-volume ink cartridge, and the small-volume ink cartridge corresponds to a second-volume ink cartridge.

In the present embodiment, the controller 71 obtains an amount of the remaining ink in the ink cartridge 180 as the status information. In this case, the controller 71 can obtain the amount of the remaining ink from a remaining-amount detecting sensor, for example. In a case where the amount of the remaining ink is less than a threshold, a total weight of the carriage 16 including a weight of the ink cartridge 180 is relatively small. As a result, there is a possibility that the carriage 16 stops on the near side of the target stopping position P0. Accordingly, when the non-ejecting flashing operation is started at the first timing T1, it is possible to complete the non-ejecting flashing operation by the timing when the carriage 16 stops. On the other hand, in a case where the amount of the remaining ink is equal to or greater than the threshold, the total weight of the carriage 16 including the weight of the ink cartridge 180 is relatively large. In this case, there is a more possibility that the carriage 16 stops on the near side of the target stopping position P0, as compared with the case where it is determined that the remaining amount of the ink is less than the threshold. Accordingly, when the carriage 16 by starting the non-ejecting flashing operation at the second timing T2 before the first timing T1, it is possible to complete the non-ejecting flashing operation by the timing when the carriage stops.

Or, the controller 71 may obtain a result detected by the IC chip reader 78 as the status information. In the detected result, in a case where it is determined that the ink cartridge 180 is relatively small-volume ink cartridge, the total weight of the carriage 16 including the ink cartridge 180 is relatively small. As a result, there is the possibility that the carriage 16 stops on the near side of the target stopping position P0. Accordingly, it is possible to complete the non-ejecting flashing operation by the timing when the carriage 16 stops by starting the non-ejecting flashing operation at the first timing T1. On the other hand, in the detected result, in a case where it is determined that the ink cartridge 180 is the large-volume ink cartridge, the total weight of the carriage 16 including the weight of the ink cartridge 180 becomes relatively large. In this case, there is a more possibility that the carriage 16 stops on the near side of the target stopping position P0, compared with the case where it is determined that the ink cartridge 180 is the small-volume ink cartridge. Accordingly, it is possible to complete the non-ejecting flashing operation by the timing when the carriage 16 by starting the non-ejecting flashing operation at the second timing T2 before the first timing T1.

According to the present embodiment, at least one of the remaining amount of the ink in the ink cartridge 180 and the detected result whether the ink cartridge 180 is the large-volume ink cartridge or the small-volume ink cartridge, which are the causes causing the carriage 16 to be stopped on the near side of the target stopping position P0, is used as the status information. As a result of this, it is possible to complete the non-ejecting flashing operation by the timing when the carriage 16 stops even if the carriage 16 stops on the near side of the target stopping position P0 due to the causes.

Modifications

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are provided below:

In the above described embodiments, the number of the printed medium W detected by the counter for the number of printed sheets is described as the status information, however, a number of ejection dots which is counted may be converted into the number of printing. In this case, it is possible to convert, for example, one hundred thousand dots into a single sheet printing.

Moreover, in the above described embodiments, the RAM 72 stores the information relating to the first timing T1 and the information relating to the correction distance α, and the controller 71 obtains the second timing T2 by adding the correction distance α to the first timing T1, however, the present disclosure is not limited to this configuration. The second timing T2 may be stored into the RAM 72 in advance.

Furthermore, in the above described embodiments, the carriage 16 on which the single ejection head 20 is mounted is described, however, the present disclosure is not limited to this configuration. Two or more ejection head 20 may be mounted on the carriage 16, moreover, in a case where an ejection head which ejects ultraviolet curable type ink is used, a light source unit can be mounted on the carriage 16 in addition to the ejection head.

Moreover, in the first embodiment, in the case where the ink cartridge integrated with the ejection head 20 as one body, as similar to the second embodiment, is used, the IC chip reader 78 reads the information of the IC chip of the ink cartridge and determines whether the integrated ink cartridge is the large-volume ink cartridge or the small-volume ink cartridge based on the information of the IC chip, however, the present disclosure is not limited to this configuration. In the case where the ink cartridge integrated with the ejection head 20 as one body, as similar to the second embodiment, is used, the IC chip reader 78 may read the information of the IC chip of the integrated ink cartridge and may transmit the information of the IC chip to the controller 71. In this case, a table for determining whether the integrated ink cartridge is the large-volume ink cartridge or the small-volume ink cartridge by referring the information of the IC chip is stored in the ROM 73 in advance. The controller 71 determines whether the ink cartridge is the large-volume ink cartridge or the small-volume ink cartridge based on the information of the IC chip and the table. In other words, the controller 71 may obtain the information of the IC chip as the status information.

Furthermore, in the second embodiment, the difference G1 between the actual stopping position Pa positioned on the far side of the target stopping position P0 and the target stopping position P0, and the difference G2 between the actual stopping position Pb positioned on the near side the target stopping position P0 and the target stopping position P0 are stored in the RAM 72 or the ROM 73 as the histories, however, the present disclosure is not limited to this configuration. The controller 71 may store, into the RAM 72 or the ROM 73, the actual stopping position Pa positioned on the far side of the target stopping position P0, the actual stopping position Pb positioned on the near side of the target stopping position P0, and the target stopping position P0 as the histories. The controller 71 may read the actual stopping position Pa positioned on the far side of the target stopping position P0 and the target stopping position P0, or may read the actual stopping position Pb positioned on the near side of the target stopping position P0 and the target stopping position P0 from the RAM 72 or the ROM 73. In this case, the controller may calculate the difference G1 based on the actual stopping position Pa positioned on the far side of the target stopping position P0 and the target stopping position P0, and may calculate the difference G2 based on the actual stopping position Pb positioned on the near side of the target stopping position P0 and the target stopping position P0.

What is claimed is:

1. A liquid ejecting apparatus, comprising:

an ejection head including a plurality of nozzles communicating with a pressure chamber and an actuator configured to apply pressure on liquid stored in the pressure chamber such that the liquid is ejected from the plurality of nozzles;

a carriage configured to reciprocate in a moving direction, the ejection head being mounted on the carriage;

a storage storing information relating to a first timing when a non-ejecting flashing operation is started, the actuator applying pressure on the liquid in the pressure chamber in the non-ejection flashing operation so as to vibrate, without ejecting, the liquid in the plurality of nozzles of the ejection head, while the carriage is decreased in speed so as to be stopped; and a controller configured to:

select, based on status information, one of the first timing and a second timing different from the first timing each stored in the storage; and start the non-ejecting-flashing operation at the selected timing while the carriage is decreased in speed so as to be stopped.

2. The liquid ejecting apparatus according to claim 1, wherein the status information indicates numerical information, wherein the first timing is a timing when the carriage reaches a position on a near side of a target-stopping-position by a first distance in the moving direction, wherein the second timing is a timing when the carriage reaches a position on the near side of the target-stopping-position by a second distance calculated by adding a correction distance to the first distance in the moving direction, wherein the controller is configured to:

start the non-ejecting-flashing operation at the first timing in a case where a numerical value indicated by the status information is less than a threshold; and start the non-ejecting-flashing operation at the second timing in a case where the numerical value indicated by the status information is equal to or greater than the threshold.

3. The liquid ejecting apparatus according to claim 2, wherein the controller is configured to correct the correction distance based on the numerical value of the status information.

4. The liquid ejecting apparatus according to claim 1, wherein the status information indicates a number of printed medium, and images are formed on the printed medium by liquid ejections from the plurality of nozzles.

5. The liquid ejecting apparatus according to claim 1, wherein the status information indicates a number of times the carriage is driven.

6. The liquid ejecting apparatus according to claim 1, wherein the storage stores a difference, as histories, between the target-stopping-position and an actual-stopping-position of the carriage when the carriage moves, and wherein the status information is the difference between the target-stopping-position and the actual-stopping-position of the carriage in the histories stored in the storage.

7. The liquid ejecting apparatus according to claim 1, further comprising a temperature sensor configured to detect environmental temperature, wherein the status information indicates a result detected by the temperature sensor.

8. The liquid ejecting apparatus according to claim 1, wherein the carriage includes a first cartridge supplying liquid to the pressure chamber, and wherein the status information indicates a remaining amount of the liquid in the first cartridge.

9. The liquid ejecting apparatus according to claim 1, wherein the carriage further includes a mount portion and a detector configured to detect whether the first cartridge mounted on the mount portion is a first-volume ink cartridge or a second-volume ink cartridge, the first cartridge storing liquid to be supplied to the pressure chamber being mounted on the mount portion, an ink volume the second-volume ink being smaller than that of the first-volume ink cartridge, and wherein the status information indicates a result detected by the detector.

10. The liquid ejecting apparatus according to claim 1, wherein the moving direction includes a first moving direction and a second moving direction, wherein the liquid ejecting apparatus further includes:

a second cartridge disposed apart from the first cartridge and storing liquid to be supplied to the pressure chamber; and a tube connecting the second cartridge and the ejection head, the tube having a curved portion having a first degree of bending in a case where the carriage moves in the first moving direction and a second degree of bending in a case where the carriage moved in the second moving direction, the second degree of bending being larger than the first degree of bending, and wherein the status information indicates the first moving direction or the second moving direction of the carriage moves in the moving direction.

11. A liquid ejecting method for a liquid ejecting apparatus, the liquid ejecting apparatus comprising:

an ejection head including a plurality of nozzles communicating with a pressure chamber and an actuator configured to apply pressure on liquid stored in the pressure chamber such that the liquid is ejected from the plurality of nozzles; and a carriage configured to reciprocate in a moving direction, the ejection head being mounted on the carriage, wherein the liquid ejecting method comprises:

selecting, based on status information, one of a first timing and a second timing different from the first timing each stored in the storage, each of the first timing and the second timing being a timing when a non-ejecting flashing operation is started, the actuator applying pressure on the liquid in the pressure chamber in the non-ejecting flashing operation so as to vibrate, without ejecting the liquid in the plurality of nozzles of the ejection head, while the carriage is decreased in speed so as to be stopped; and starting the non-ejecting-flashing operation at the selected timing while the carriage is decreased in speed so as to be stopped.

12. A non-transitory storage medium storing a plurality of instructions executable by a computer of a liquid ejecting apparatus, the liquid ejecting apparatus comprising:

an ejection head including a plurality of nozzles communicating with a pressure chamber and an actuator configured to apply pressure on liquid stored in the pressure chamber such that the liquid is ejected from the plurality of nozzles; and a carriage configured to reciprocate in a moving direction, the ejection head being mounted on the carriage, wherein, when executed by the computer, the plurality of instruction cause the liquid ejecting apparatus to:

select, based on status information, one of a first timing and a second timing different from the first timing each stored in the storage, each of the first timing and the second timing being a timing when a non-ejecting flashing operation is started, the actuator applying pressure on the liquid in the pressure chamber in the non-ejecting flashing operation so as to vibrate, without ejecting the liquid in the plurality of nozzles of the ejection head, while the carriage is decreased in speed so as to be stopped; and start the non-ejecting-flashing operation at the selected timing while the carriage is decreased in speed so as to be stopped.

* * * * *